(12) United States Patent
Nakai (10) Patent No.: US 7,446,918 B2
(45) Date of Patent: Nov. 4, 2008

(54) LIGHT SCANNING DEVICE

(75) Inventor: Jun Nakai, Osaka (JP)

(73) Assignee: Kyocera Mita Corporation (JP)

( * ) Notice: Subject to any disclaimer, the term of this patent is extended or adjusted under 35 U.S.C. 154(b) by 0 days.

(21) Appl. No.: 12/018,842

(22) Filed: Jan. 24, 2008

(65) Prior Publication Data

US 2008/0180773 A1     Jul. 31, 2008

(30) Foreign Application Priority Data

Jan. 29, 2007    (JP)  .............................. 2007-017678

(51) Int. Cl.
*G02B 26/08* (2006.01)

(52) U.S. Cl. ......................... 359/206; 359/207; 359/216

(58) Field of Classification Search ................... 359/206
See application file for complete search history.

(56) References Cited

U.S. PATENT DOCUMENTS 5,557,446 A * 9/1996 Kato ......................... 359/206
6,987,593 B2 * 1/2006 Hayashi et al. ............. 359/205
7,038,823 B2    5/2006 Morimoto et al.

FOREIGN PATENT DOCUMENTS

JP          2006-39399       2/2006

* cited by examiner

*Primary Examiner*—James Phan
(74) *Attorney, Agent, or Firm*—Gerald E. Hespos; Anthony J. Casella (57) ABSTRACT

A rotational multifaceted mirror (24) deflects a laser light outgoing from a semiconductor laser (21), so that the light scanning device (2) which scans the photoconductive drum (131) has a third optical system (25) having a correction lens (5) whose curvature radii are different on the incident side surface (5a) and the outgoing side surface (5b) in a cross section in the sub-scanning direction which is perpendicular to the main scanning direction. The correction lens (5) is so configured as to be rotatable about a line (L2) which passes through an intersection "a" between an optical axis (L1) of the correction lens (5) and a surface having a curvature radius which is smaller among the surfaces (5a, 5b) and is rotatable about a line (L2) parallel to the main scanning direction.

16 Claims, 8 Drawing Sheets

PLANOCONCAVE LENS

FIG.5F

MENISCUS

LIGHT SCANNING DEVICE

BACKGROUND OF THE INVENTION

1. Field of the Invention

The present invention relates to a light scanning device.

2. Description of the Related Art

Conventionally, (for example, refer to a patent document 1: Japanese Patent Unexamined Publication 2006-39399) there has been a known light scanning device which is mounted in, for example, an image forming apparatus to scan to a photoconductive drum as a scanned member by deflecting on a rotational multifaceted mirror a laser light irradiated from a light source. In such light scanning device, normally, there is provided a first optical system and a second optical system between the light source and the rotational multifaceted mirror, and a third optical system is provided between the rotational multifaceted mirror and an outgoing slit through which the light goes out.

The first optical system is adapted to form the laser light outgoing from the light source into a parallel light flux. The second optical system is adapted to collect the laser light formed into the parallel light flux toward a sub-scanning direction which is perpendicular to a main scanning direction as a direction in which the scanning is performed, so that an image is formed linearly on the rotational multifaceted mirror. On the other hand, the third optical system has a function to render a scanning speed of the laser light scanned on the photoconductive drum and deflected by the rotational multifaceted mirror to be a constant speed, so that a dot-like image of the light deflected by the rotational multifaceted mirror is formed on the photoconductive drum.

Meanwhile, in the light scanning device, a laser scanning line may curve on the photoconductive drum in a sub-scanning direction in accordance with accuracy in assembling components (namely, generation of bowing). Here, the patent document 1 discloses that an fθ lens constituting the third optical system is rotated about a line which is parallel to the main scanning direction so as to adjust the amount of curving of the laser scanning line on the photoconductive drum.

When the fθ lens is rotated to adjust the amount of curving of the laser scanning line on the photoconductive drum like the case of the patent document 1, its rotation center is generally set at a center of the fθ lens, in other words, at a center between intersections at which an optical axis of the fθ lens intersects with an incident side surface and an outgoing side surface of the fθ lens. In the case where such configuration is adopted, the curving of the laser scanning line on the photoconductive drum can be improved when the fθ lens is rotated. However, the scanning line shifts largely in the sub-scanning direction.

SUMMARY OF THE INVENTION

In view of such circumstance as described above, an object of the present invention is to provide a light scanning device capable of suppressing shifting of the scanning line in the sub-scanning direction to be small and adjusting the amount of curving of the laser scanning line on a scanned member.

In aim of achieving the above-described object, the present invention includes a light scanning device for scanning a scanned member by deflecting on a multifaceted mirror a laser light irradiated from a scanning light source, the light scanning device comprising: a first optical system for forming the laser light irradiated from the light source into a parallel light flux; a second optical system for collecting the laser light formed into the parallel light flux toward a sub-scanning direction perpendicular to a main scanning direction, which is a direction to perform the scanning to form an image linearly on the rotational multifaceted mirror; and a third optical system having a function to render a scanning speed of the laser light deflected by the rotational multifaceted mirror on the scanned member to be a constant speed and form a spot-like image of the laser light deflected by the rotational multifaceted mirror. The third optical system includes a correction lens whose incident side surface and outgoing side surface in a cross section in the sub-scanning direction perpendicular to the main scanning direction have respective curvature radii different from one another, and the correction lens is so configured as to be rotatable about a line passing through an intersection between an optical axis of the correction lens and a surface having a smaller curvature radius among the surfaces, and being parallel to the main scanning direction.

According to the present invention based on the above-described configuration, the correction lens of the third optical system is so configured as to be rotatable about a line parallel to the main scanning direction, rotation of the correction lens enables adjustment of the amount of curving of the laser scanning line on the scanned member. Further, since the correction lens can rotate about a line passing through an intersection between the optical axis of the correction lens and the surface having a smaller curvature radius among those of the incident side surface and the outgoing side surface, the amount of movement of the scanning line in the sub-scanning direction becomes smaller even if the correction lens is rotated. In other words, according to the present invention, the amount of shifting of the scanning line in the sub-scanning direction can be suppressed to be small, and the amount of curving of the laser scanning line on the scanned member can be adjusted.

These and other objects, features and advantages of the present invention will become apparent upon reading of the following detailed description along with the accompanied drawings.

DETAILED DESCRIPTION OF THE PREFERRED EMBODIMENTS

Hereinafter, an embodiment for practicing the present invention will be described with reference to the drawings.

Figure 1:
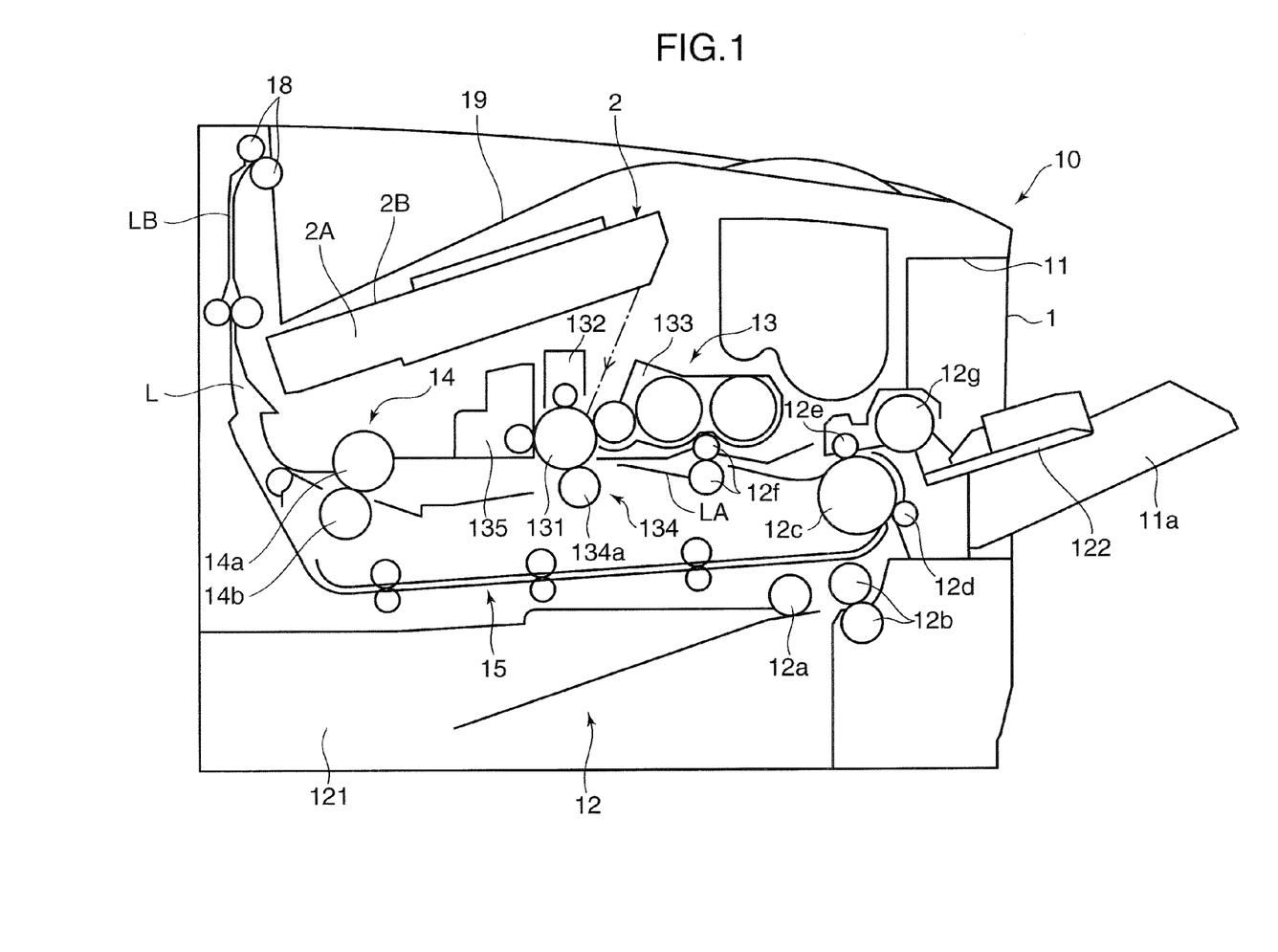
FIG. 1 schematically showing a configuration of a printer to which a light scanning device in accordance with an embodiment of the present invention is mounted.

FIG. 1 schematically shows a configuration of a printer 10 to which a light scanning device (which is also named a laser scanner unit or an LSU) 2 in accordance with an embodiment of the present invention. The light scanning device 2 can be mounted also to an image forming apparatus which is other than a printer (for example, a copying machine, a facsimile machine, and a complex machine).

The printer 10 is adapted to convey a sheet along a conveying passage L and form an image onto a sheet based on image data transmitted from a terminal and the like in mid-course of the conveying passage L. The printer 10 includes in its box-shaped apparatus main body 1 an image forming section 13, a sheet feeding section 12, and a fixing section 14. The image forming section 13 forms a toner image onto a surface of a photoconductive drum 131 and thereafter transfers the toner image to a sheet. The sheet feeding section 12 feeds the sheet to the image forming section 13. The fixing section 14 fixes the toner image onto the sheet.

The conveying passage L includes a horizontal portion LA extending horizontally from a front side to a rear side (from a right side to a left side in FIG. 1), and a vertical portion LB standing substantially vertically from a rear end portion of the horizontal portion LA, so that the conveying passage L has a substantially L-shape in a side view.

The sheet feeding section 12 has a sheet feeding cassette 121 arranged under the horizontal portion LA of the conveying passage L, and it takes out a sheet accommodated in the sheet feeding cassette 121 with use of a pickup roller 12a and sends the sheet one after another to the horizontal portion LA of the conveying passage L with use of sheet feeding rollers 12b through 12e. Further, the sheet feeding section 12 allows the sheet sent to the conveying passage L to wait temporarily with use of a registration roller 12f, and then feeds the sheet to the image forming section 13 at a predetermined timing.

Further, the sheet feeding section 12 has also a manual feeding unit 122 provided at an opening 11 formed in a front surface of the apparatus main body 1, so that a sheet placed on the manual feeding unit 122 can be sent to the horizontal portion LA of the conveying passage L with use of a pickup roller 12g and a sheet feeding rollers 12c, 12e. The opening 11 can be opened and closed with use of a cover member 11a mounted swingably to the apparatus main body 1.

The image forming section 13 includes a photoconductive drum 131 provided at a substantially central portion in the forward and backward directions of the horizontal portion LA of the conveying passage L, a charging device 132 provided above the photoconductive drum 131, a developing section 133 provided in front of the photoconductive drum 131, a transferring section 134 provided under the photoconductive drum 131, a cleaning section 135 provided behind the photoconductive drum 131, and a light scanning device 2 provided above the charging device 132, the cleaning section 135, and the fixing section 14 in such a posture that its front side is lifted upward.

The photoconductive drum 131 is rotated in a clockwise direction in FIG. 1, and its surface is uniformly charged by the charging device 132 and thereafter the light scanning device 2 irradiates a laser light based on image data to the surface through a clearance between the charging device 132 and the developing section 133, so that an electrostatic latent image is formed on the surface. Then, toners are supplied from the developing section 133 to the surface on which the electrostatic latent image is formed, so that a toner image formed.

Then, the sheet supplied from the sheet feeding section 12 is conveyed by a transferring roller 134a of the transferring section 134 while being pressed against the photoconductive drum 131, so that a toner image formed on the surface of the photoconductive drum 131 is transferred to the surface of the sheet (transfer surface) and thereafter sent to the fixing section 14.

Electric charge and toners which remain on the surface of the photoconductive drum 131 after the transfer are removed by the cleaning section 135.

The fixing section 14 has a heat roller 14a and a pressure roller 14b, and uses the rollers 14a, 14b to press therebetween the sheet on which the toner image is formed, so that the toner image is fixed with use of heat and pressure.

Then, the sheet on which the toner image is fixed is discharged by a sheet-discharging roller 18 to a sheet discharging section 19 which is formed on an upper surface of the apparatus main body 1.

In printer 10 of the present embodiment, there is provided a switch-back portion 15 between the horizontal portion LA of the conveying passage L and the sheet feeding cassette 121, so that images can be formed on both side surfaces of the sheet.

Figure 2:
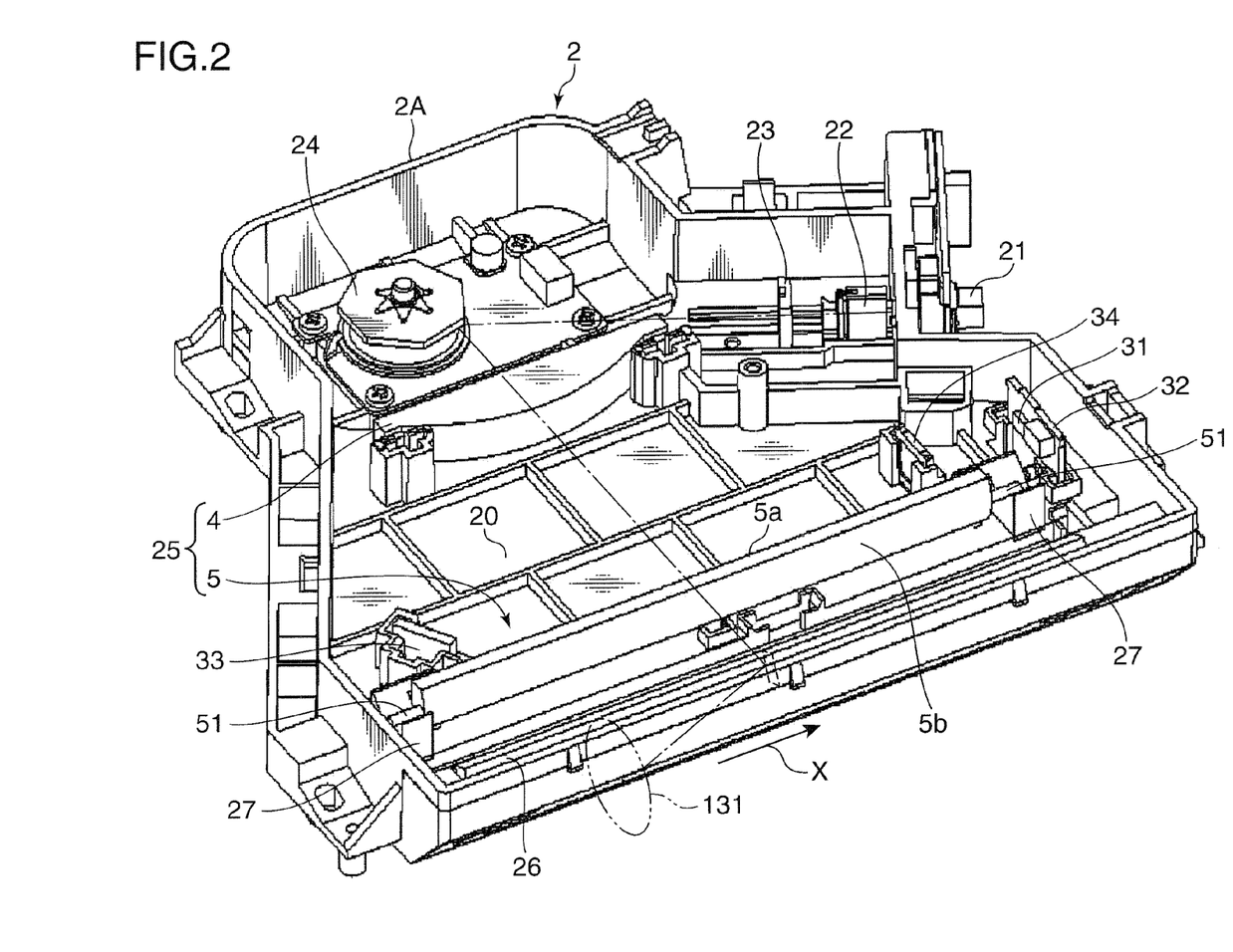
FIG. 2 is a perspective view showing the light scanning device.

In particular, as shown in FIG. 2, the light scanning device 2 deflects a laser light outgoing from a semiconductor laser 21 as a light source with use of a rotational multifaceted mirror (also named a polygon mirror) 24 to scan the photoconductive drum 131 as a scanned member (refer to an arrow X in FIG. 2). The light scanning device 2 includes a container-like housing 2A which accommodates the rotational multifaceted mirror 24 and is open on an upper side, and a cover member 2B (refer to FIG. 1) which closes the opening of the housing 2A. The cover member 2B is not illustrated in FIG. 2.

The semiconductor laser 21 is provided at a substantially central portion in forward and backward directions of a right side wall portion of the housing 2A, and it is adapted to allow a laser light to go out obliquely backward on a surface parallel to a bottom surface 20 of the housing 2A.

The rotational multifaceted mirror 24 is so formed as to have a shape of a right heptagonal plate, and is arranged at a rear side position of the housing 2A in such a posture as to be parallel to the bottom surface 20. The rotational multifaceted mirror 24 is rotated in a counter-clockwise direction in a plan view at a constant speed by a motor which is fixed in such a state that a rotational axis is perpendicular to the bottom surface 20 of the housing 2A. In other words, in the housing 2A, a direction parallel to the bottom surface 20 is a main scanning direction for performing the scanning, and a direction perpendicular to the bottom surface 20 is a sub-scanning direction which is perpendicular to the main scanning direction.

Further, in the housing 2A, a coupling lens unit 22 and a cylindrical lens 23 are provided in addition to the rotational multifaceted mirror 24 at a position between the semiconductor laser 21 and the rotational multifaceted mirror 24, and a first fθ lens 4 and a second fθ lens being the correction lens 5 are provided in side by side in front of the rotational multifaceted mirror 24. Further, in front of the correction lens 5, there is provided a reflective mirror 26 which reflects the laser light transmitted through the first fθ lens 4 and the correction lens 5 toward the photoconductive drum 131. Furthermore, in the housing 2A, there is formed an opening (outgoing slit) at a position through which the laser light reflected by the reflective mirror 26 passes, and a dust proofing glass (not illustrated) is provided so as to cover the opening, so that the laser light passes through the dust proofing glass and then goes out from the housing 2A.

The coupling lens unit 22 includes a lens tube having a shape like a circular cylinder, a coupling lens provided in the lens tube and being a first optical system adapted to form the laser light outgoing from the semiconductor laser 21 into a parallel light flux (not illustrated), and an aperture (not illustrated) formed in the lens tube for reshaping the laser light formed into the parallel light flux.

The cylindrical lens 23 constitutes a second optical system for collecting the laser light formed into the parallel light flux toward the sub-scanning direction to linearly form an image on the rotational multifaceted mirror 24. The second optical system may be so configured as to include a troidal lens in place of the cylindrical lens.

Two optical devices including the first fθ lens 4 and the correction lens 5 constitute a third optical system having a function of making a scanning speed of the laser light deflected by the rotational multifaceted mirror 24 on the photoconductive drum 131 to be a constant speed, and constitute and forming a dot-like image of the laser light deflected by the rotational multifaceted mirror 24 onto the photoconductive drum 131. Details of the correction lens 5 will be described hereinafter.

Further, in the housing 2A, as a configuration for obtaining a horizontal synchronizing signal for determining an image writing timing in an image area where the scanning is performed, there is provided on the right front side position a photoelectric element 31 which is mounted to the circuit board 32, and a reflective mirror 33 on the front left side position for reflecting the laser light reflected by the rotational multifaceted mirror 24 toward the photoelectric element 31 before the laser light enters the image area. Furthermore, there is provided a collective lens 34 for collecting the laser light reflected by the reflective mirror 33 between the reflective mirror 33 and the photoelectric element 31. Then, the laser light reflected by the reflective mirror 33 and collected by the collective lens 34 is received by the light receiving element 31 so that the horizontal synchronizing signal is obtained. A timing to start light emission by the semiconductor laser 21 on the image area is controlled based on the horizontal synchronizing signal.

Figure 3A:
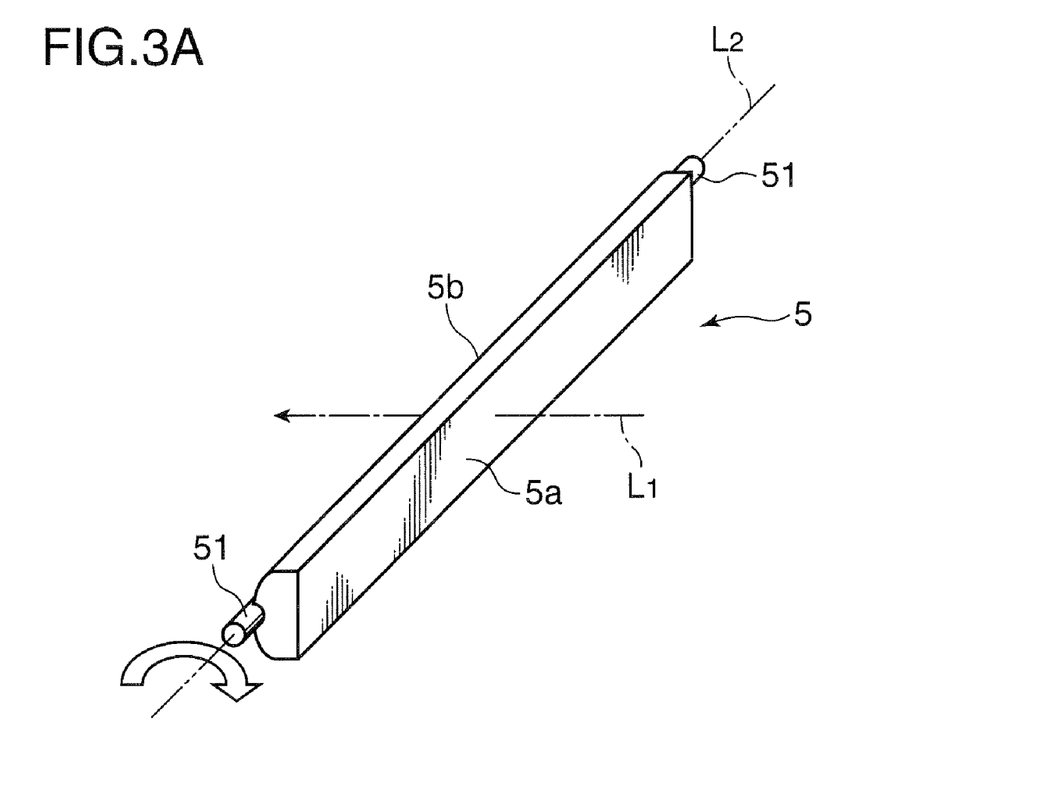
FIG. 3A is a perspective view showing the correction lens.
Figure 3B:
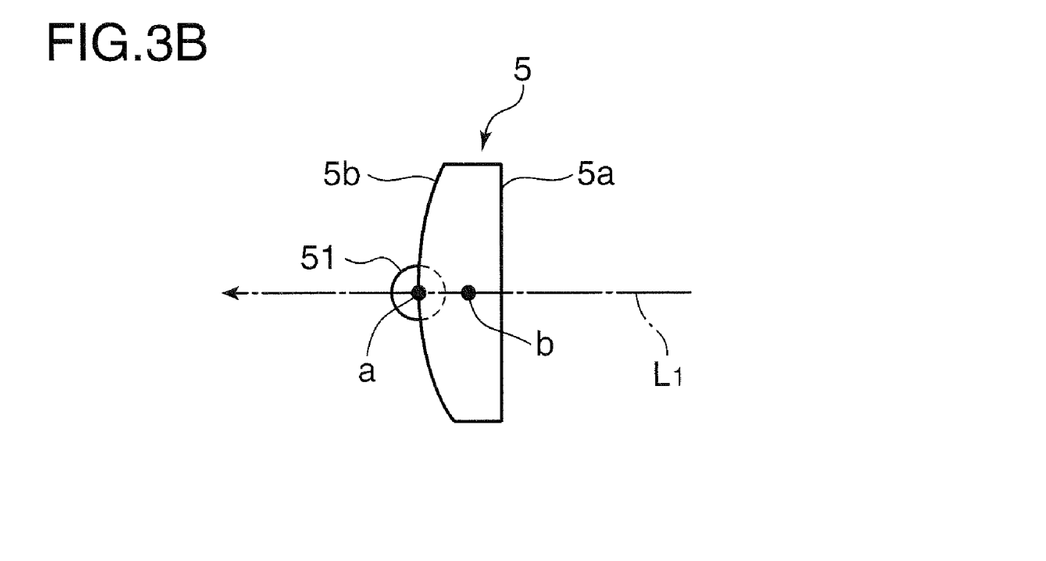
FIG. 3B is a sectional view of the correction lens taken at an optical axis in a cross-section in the sub-scanning direction.

A typical example of the correction lens 5 is shown in FIGS. 3A, 3B. As shown in FIGS. 3A, 3B, it is a cylinder lens (also named a plano-concave lens) having a certain cross-sectional shape and extending in the main scanning direction. A surface on the incident side (hereinafter, simply referred to as "incident surface") 5a has a flat surface, and a surface on the outgoing side (hereinafter, simply referred to as "outgoing surface") 5b has a cylindrical surface being convex in a direction in which a light is transmitted. In other words, in a cross section in the sub-scanning direction which is perpendicular to the main scanning direction, a curvature radius of the incident surface 5a is infinite, and a curvature radius of the outgoing surface 5b is a predetermined value (for example, 100 mm), and the curvature radius of the outgoing surface 5b is smaller than the curvature radius of the incident surface 5a.

Further, at opposite end surfaces in the main scanning direction of the correction lens 5, there are provided cylindrical bosses 51 extending in the main scanning direction, respectively. A center of each boss 51 matches with an intersection "a" of the optical axis L1 and the outgoing surface 5b of the correction lens 5 in view from the main scanning direction. In other words, each boss 51 passes through the intersection "a" between the optical axis L1 and the outgoing surface 5b of the correction lens 5, and has a cylindrical shape having a center line corresponding to a line L2 parallel to the main scanning direction. Here, the optical axis L1 of the correction lens 5 indicates a line which is a center in the main scanning direction of the correction lens 5 and also a line which is a center of the correction lens 5 in the sub-scanning direction.

Further, on the bottom surface 20 of the housing 2A, there is provided a pair of lens supporting portions 27 each having a V-shaped recess whose upper part is open so that the boss 51 can be engaged. Each of the bosses 51 of the correction lens 5 is engaged with a respective recess of the lens supporting portion 27, so that the correction lens 5 is supported rotatably about the line L2.

In the light scanning device 2 of the present embodiment, the correction lens 5 of the third optical system 25 is so configured that it is rotatable about the line L2 which is parallel to the main scanning direction, so that rotation of the correction lens 5 enables to adjust the amount of curving of a laser scanning line on the photoconductive drum 131. Further, since the line L2 is a line which passes through the intersection "a" between the optical axis L1 of the correction lens 5 and the outgoing surface 5b having a smaller curvature radius among the incident surface 5a and the outgoing surface 5b, shift of the scanning line in the sub-scanning direction becomes small even if the correction lens 5 is rotated. In other words, according to the configuration of the present embodiment, the amount of curving of the laser scanning line on the photoconductive drum 131 can be adjusted while suppressing the shift of the scanning line in the sub-scanning direction to be small.

Further, since the correction lens 5 is an optical device which is provided at a position most apart from the rotational multifaceted mirror 24 among the two optical devices of the third optical system, the amount of curving of the laser scanning line on the photoconductive drum 131 can be fine-adjusted.

The effect described above can be achieved also with a correction lens having a configuration which is similar to that shown in FIG. 3B, in other words, the configuration shown in FIG. 5B (a correction lens having an incident surface having a curvature which is larger than that of the outgoing side surface), and an effect of it will be described with reference to the correction lens 5 having the configuration shown in FIG. 5B.

Figure 5A:
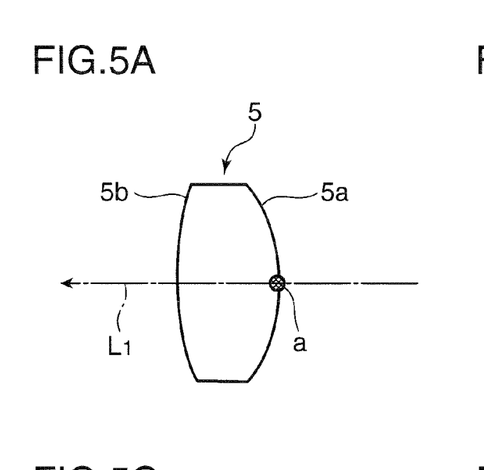
FIGS. 5A through 5F are sectional views of a modified example of the correction lens taken at the optical axis in the cross-section in the sub-scanning direction.
Figure 5B:
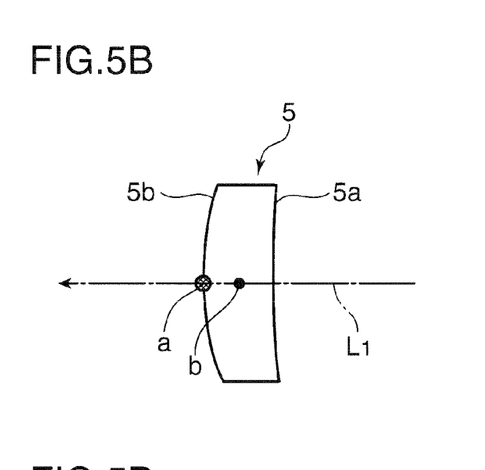
Figure 5C:
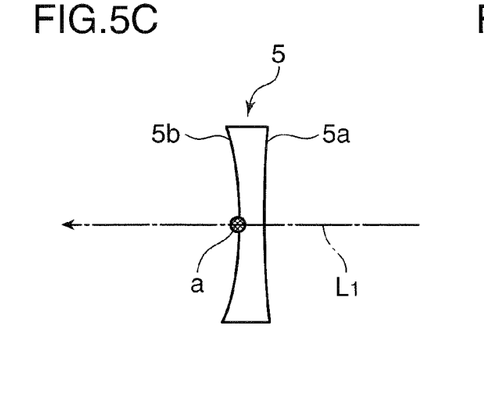
Figure 5D:
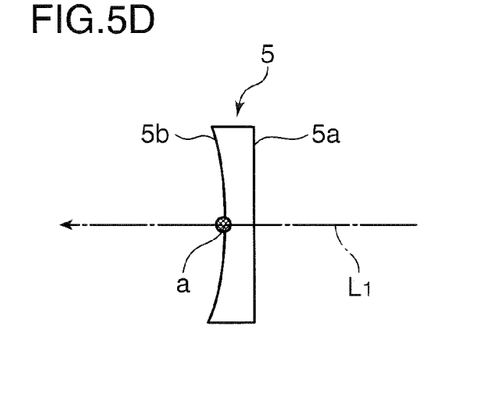

Obviously, the effect described above can be obtained not only with use of the correction lenses having the configurations of FIGS. 3B and 5B. It is proven that the effect can be attained also with use of configurations shown in FIGS. 5A through 5F or 6 as will be described herebelow. In other words, it is proven that the effect described above can be attained by setting the bosses 51 of the correction lenses having these various configurations so that each of the bosses 51 passes through an intersection between an optical axis of the correction lens and a lens surface having a smaller curvature radius and the correction lens is rotatable about a line which is parallel to the main scanning direction.

Figure 4A:
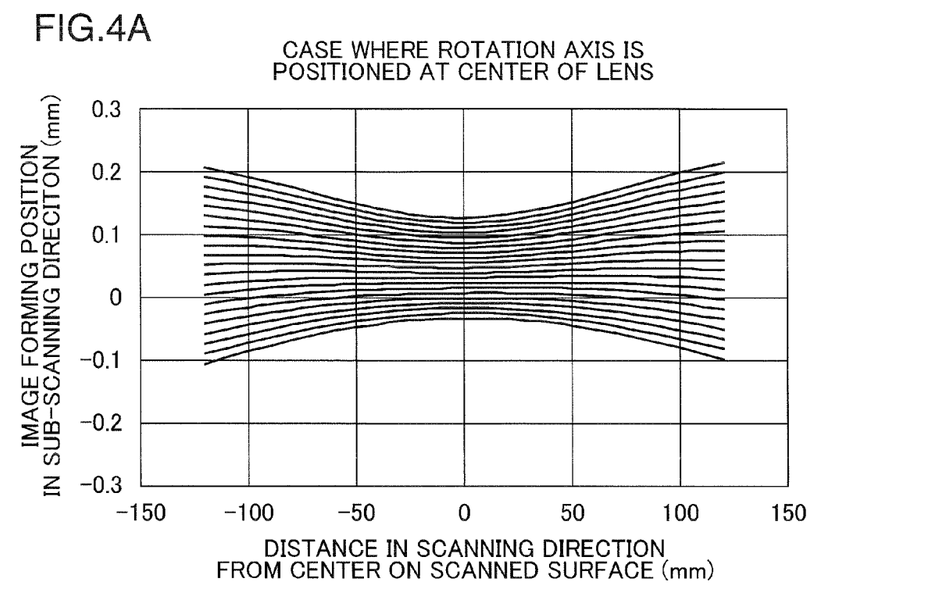
FIG. 4A illustrates changes of the scanning line in the case where the correction lens is rotated about a center of the lens.
Figure 4B:
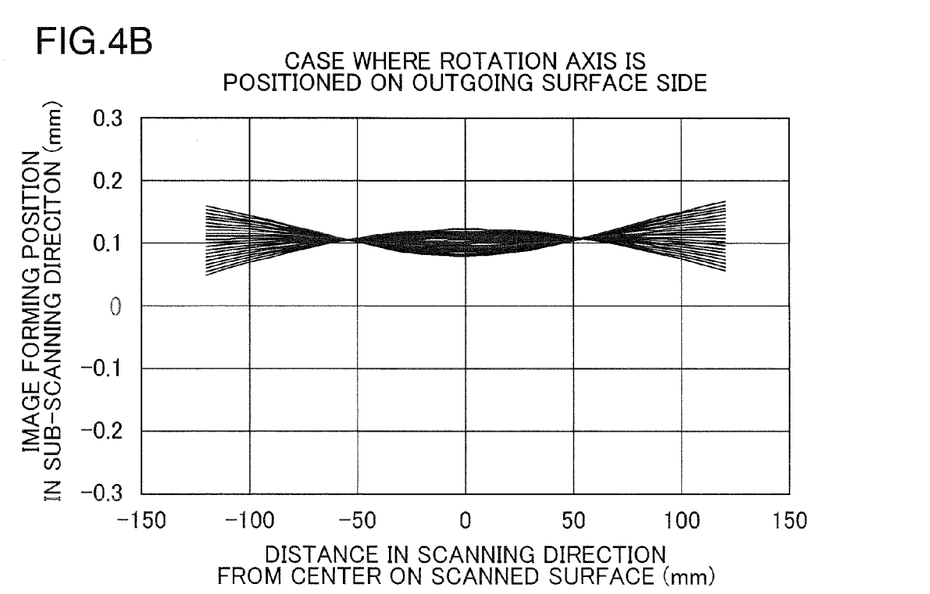
FIG. 4B illustrates changes of the scanning line in the case where the correction lens provided in the light scanning device in accordance with an embodiment of the present invention is rotated.

FIG. 4A shows changes of the scanning line in the case where a rotation center of the correction lens 5 is set at a center "b" of the correction lens 5 (refer to FIG. 5B), in other words, set at a center between intersections of the optical axis L1 of the correction lens 5 with respect to the incident surface 5a and the outgoing surface 5b of the correction lens 5, and the angle of the correction lens 5 is changed at an interval of 0.2 degrees in the range between −2 degrees and +2 degrees. FIG. 4B shows changes of the scanning line in the case where the angle of the correction lens 5 having the configuration of the present embodiment (in other words, rotating about the intersection "a" as shown in FIG. 5B) at an interval of 0.2 degrees in the range between −2 degrees and +2 degrees.

Specifications and other conditions of the optical system used for obtaining experimental results are as shown in the following tables (Table 1-Table 3). As described above, the correction lens (second fθ lens) 5 of a type shown in FIG. 5B is used in the experiment, and a layout of the optical system used in the experiment is shown in FIG. 4C.

Figure 4C:
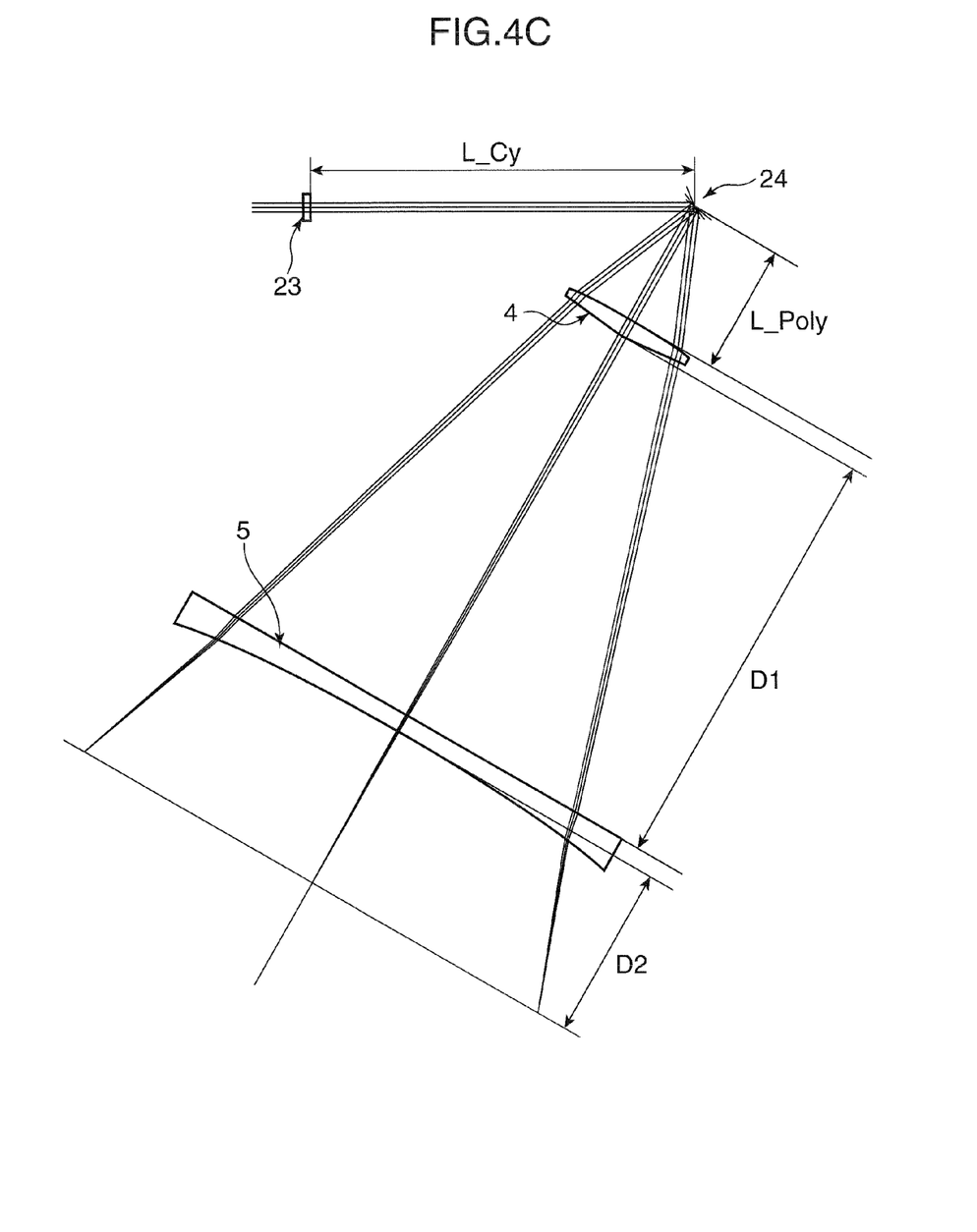
FIG. 4C shows a layout of the optical system used for obtaining data of FIGS. 4A and 4B.

As shown in FIG. 4C, the layout of the optical system is so provided that a distance between the cylindrical lens 23 and the reflection surface of the rotational multifaceted mirror (polygon) 24 is L_Cy, and a distance between a reflecting point of polygon and an incident surface of the first fθ lens 4 is L_Poly, and a distance between an outgoing surface of the first fθ lens 4 and the incident surface of the correction lens (second fθ lens) 5 is D1, and a distance between the outgoing surface of the correction lens (second fθ lens) 5 and the scanned surface is D2.

TABLE 1

Optical device arrangement parameter (mm)

| | |
|---|---|
| L_Cy | 177.1 |
| L_Poly | 60.0 |
| D1 | 200 |
| D2 | 80 |

TABLE 2

Basic optical design value

| BASIC DESIGN VALUE ITEMS OF OPTICAL DESIGN | | UNIT | VALUE | REMARKS |
|---|---|---|---|---|
| DESIGN WAVELENGTH | | nm | 670 | |
| FOCAL DISTANCE OF F θ LENS IN MAIN SCANNING DIRECTION | | mm | 300 | |
| BEAM RADIUS AFTER PASSING THROUGH APERTURE | MAIN SCANNING DIRECTION | mm | 4.7 | |
| | SUB-SCANNING DIRECTION | mm | 1.7 | |
| POLYGON | NUMBER OF FACES | FACE | 9 | |
| | DIAMETER OF CIRCUMCIRCLE | mm | 40 | |
| | INCIDENT ANGEL | deg | 60 | ANGLE BETWEEN F θ OPTICAL AXIS AND BUNDLE OF PRINCIPAL LIGHT RAY OUTGOING FROM CYLINDRICAL LENS |

As can be seen from FIG. 4A, in the case where a rotation center of the correction lens 5 is set at the center "b" of the correction lens 5, rotation of the correction lens 5 improves curving of the laser scanning line on the photoconductive drum 131, but it causes a large shift of the scanning line in the sub-scanning direction. When the scanning line is shifted largely like above, the scanning light hits the charging device 132, the developing section 133 and the like before the laser light irradiated from the light scanning device 2 reaches the

TABLE 3

Data of cylindrical lens and fθ lens

| OPTICAL DEVICE | CYLINDRICAL LENS | | FIRST F θ LENS | | SECOND F θ LENS | |
|---|---|---|---|---|---|---|
| REFRACTIVE INDEX λ = 670(nm) | 1.513439 | | 1.507203 | | 1.507203 | |
| CORE THICKNESS (mm) | 3 | | 8 | | 8 | |
| SHAPE OF CURVED SURFACE | INCIDENT SURFACE CYLINDRICAL SURFACE | OUTGOING SURFACE FLAT SURFACE | INCIDENT SURFACE Y-TORIC SURFACE | OUTGOING SURFACE Y-TORIC SURFACE | INCIDENT SURFACE ROTATION SYMMETRY ASPHERIC SURFACE | OUTGOING SURFACE Y-TORIC SURFACE |
| CURVATURE RADIUS IN SUB-SCANNING DIRECTION (Rx)(mm) | 92.4 | ∞ | −1.22E+01 | −1.37E+01 | — | −3.23E+01 |
| CURVATURE RADIUS IN MAIN SCANNING DIRECTION (Ry)(mm) (R IN CASE OF ROTATION SYMMETRY ASPHERIC SURFACE | ∞ | ∞ | 1.64E+04 | −1.43E+02 | −1.84E+03 | 8.47E+02 |
| KORENICH CONSTANT (K) | — | — | −2.29E+06 | −1.97E+00 | 3.09E+02 | 0.00E+00 |
| 4Th COEFFICIENT (A) | — | — | 1.38E−07 | 8.38E−08 | 2.77E−08 | 0.00E+00 |
| 6TH COEFFICIENT (B) | — | — | 6.70E−10 | 6.47E−10 | 4.37E−12 | 0.00E+00 |
| 8TH COEFFICIENT (C) | — | — | 7.44E−13 | 3.08E−13 | −7.21E−16 | 0.00E+00 |
| 10TH COEFFICIENT (D) | — | — | −3.32E−17 | 3.53E−16 | 4.42E−20 | 0.00E+00 |

Where
Y-toric surface definition $$\begin{cases} f(y) = \dfrac{y^2/R_y}{1+\sqrt{1-(1+K)y^2/R_y^2}} + Ay^4 + By^6 + Cy^8 + Dy^{10} \\ \text{Sag} = f(y) + R_x\left(1 - \sqrt{1-(x/R_x)^2}\right) \end{cases}$$

Rotation symmetry aspheric surface definition $$\begin{cases} \text{Sag} = \dfrac{r^2/R}{1+\sqrt{1-(1+K)r^2/R^2}} + Ar^4 + Br^6 + Cr^8 + Dr^{10} \\ r^2 = x^2 + y^2 \end{cases}$$

photoconductive drum 131, so that it causes unexpected reflections and affects an image quality.

On the other hand, according to the configuration of the present embodiment, as shown in FIG. 4B, curving of the laser scanning line on the photoconductive drum 131 can be improved without causing a large shift of the scanning line in the sub-scanning direction. Thus, a path of light is not shifted largely before reaching from the light scanning device 2 to the photoconductive drum 131, so that the laser light can be led to the photoconductive drum 131 without being shut off.

In the embodiment, a configuration in which the correction lens 5 is a cylinder lens is described. However, the correction lens 5 may be any lens as long as curvature radii of the incident surface 5a and the outgoing surface 5b viewed from a cross section in the sub-scanning direction cross section are different, and the correction lens 5 may be a troidal lens.

Figure 5E:
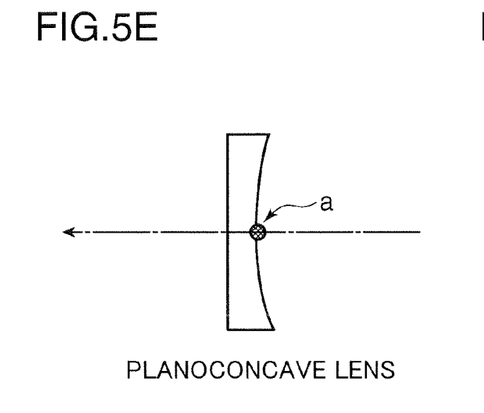
Figure 5F:
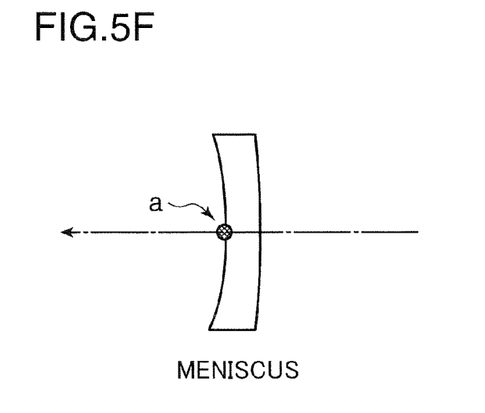

For example, the correction lens 5 may be a biconvex lens like the one shown in FIG. 5A or may be a meniscus lens like the one shown in FIG. 5B. Further, the correction lens 5 may be a biconcave lens like the one shown in FIG. 5C and a plano-concave lens like the one shown in FIG. 5D. Further, the correction lens 5 may be a concave-plane lens having an concave shape on the incident side and a flat surface on the outgoing side as shown in FIG. 5E, or it may be a lens having a convex shape on the incident side and a concave shape on the outgoing side (meniscus shape) as shown in FIG. 5F.

In short, even in the case where the correction lens 5 is so shaped as shown in FIGS. 5A through 5F, it would be enough if the correction lens 5 is rotatable about a line which passes through an intersection "a" between the optical axis L1 of the correction lens 5 and a surface having a smaller curvature radius among the incident surface 5a and the outgoing surface 5b and is parallel to the main scanning direction.

Figure 6:
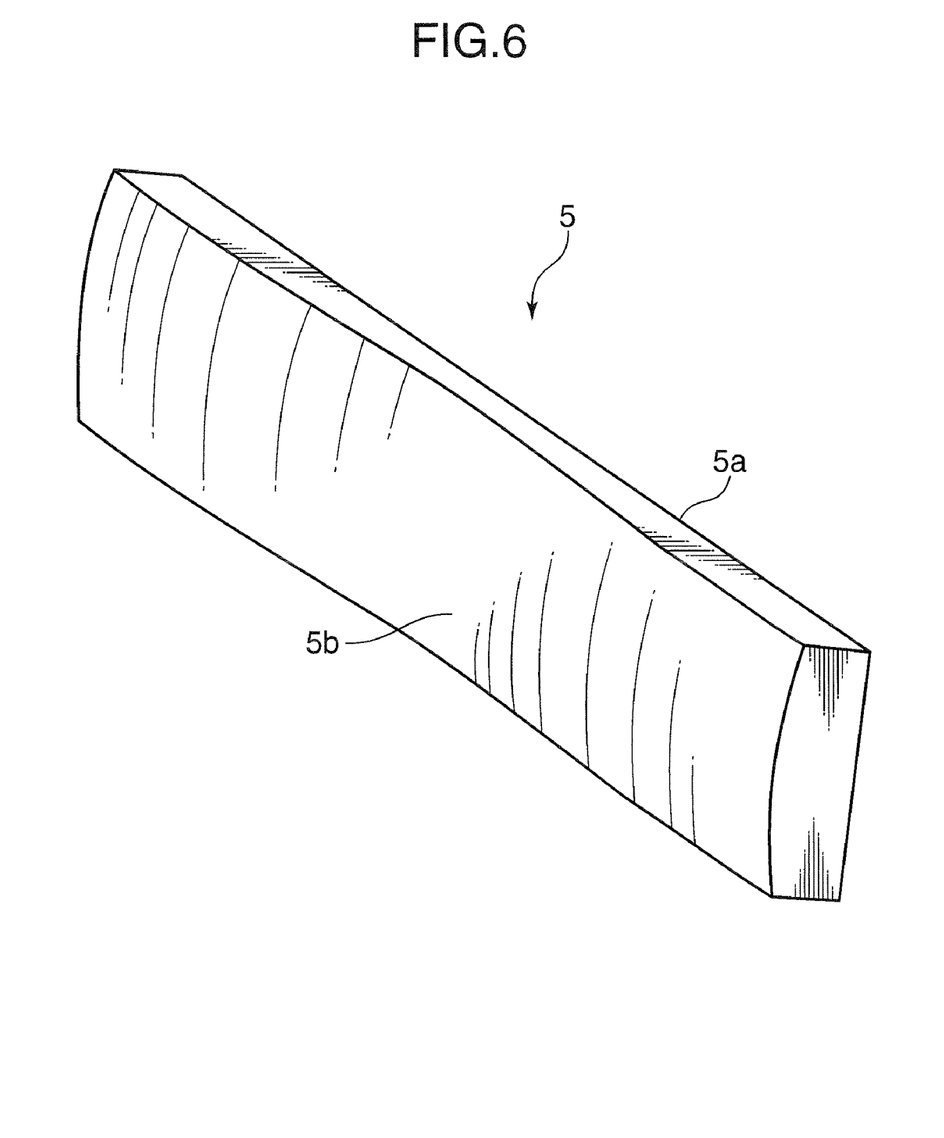
FIG. 6 is a perspective view of the correction lens of the modified example.

Further, the incident surface 5a and the outgoing surface 5b of the correction lens 5 may have an anamorphic-curved surface whose curvature radius viewed from a cross section in the sub-scanning direction changes successively along the main scanning direction, like the one shown in FIG. 6. Further, in the example shown in FIG. 6, a shape of the lens surface 5b viewed from a cross section in the sub-scanning direction is arc-shaped in any cases. However, there may be a part forming a non-arc shaped cross section.

Figure 7:
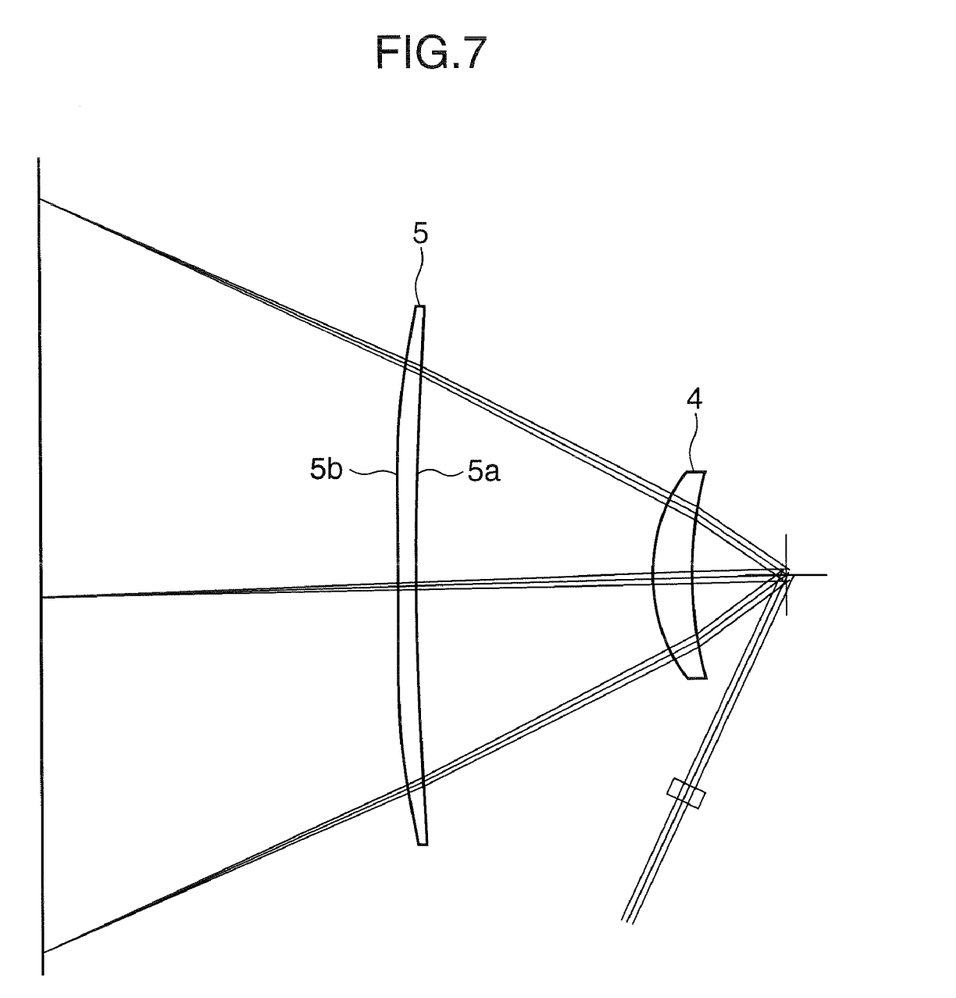
FIG. 7 shows a layout of the correction lens of the modified example.

Further, the incident surface 5a and the outgoing surface 5b of the correction lens 5 may be a non-arc shaped in the cross section in the main scanning direction which is perpendicular to the sub-scanning direction, as shown in FIGS. 6 and 7.

Further, for making the correction lens 5 be rotatable, it would not be necessarily needed to provide bosses 51 to the correction lens 5. For example, though it is not illustrated, the correction lens 5 may be retained by the retaining member, so that the retaining member is axially supported by the housing 2A.

Further, the third optical system 25 may be constituted by three or more optical devices. In this case, it would be enough to configured that an optical device which is located at the farthermost position from the rotational multifaceted mirror 24 be the correction lens 5. Alternatively, the third optical system 25 may be constituted by only one correction lens 5.

Further, in the embodiment, a configuration is described to which the present invention is applied to a monochromatic image forming apparatus. However, the present invention is especially effective for a tandem color image forming apparatus in view of suppressing a color dislocation to minimize dislocation of color among respective colors.

Further, the light scanning apparatus 2 is not limited to be mounted to only an image forming apparatus, and it may be applied also to a printing machine which directly scans a laser light to a sheet for printing.

In summary, the present invention includes a light scanning device for scanning a scanned member by deflecting on a multifaceted mirror a laser light irradiated from a scanning light source, the light scanning device comprising: a first optical system for forming the laser light irradiated from the light source into a parallel light flux; a second optical system for collecting the laser light formed into the parallel light flux toward a sub-scanning direction perpendicular to a main scanning direction, which is a direction to perform the scanning to form an image linearly on the rotational multifaceted mirror; and a third optical system having a function to render a scanning speed of the laser light deflected by the rotational multifaceted mirror on the scanned member to be a constant speed and form a spot-like image of the laser light deflected by the rotational multifaceted mirror. The third optical system includes a correction lens whose incident side surface and outgoing side surface in a cross section in the sub-scanning direction perpendicular to the main scanning direction have respective curvature radii different from one another, and the correction lens is so configured as to be rotatable about a line passing through an intersection between an optical axis of the correction lens and a surface having a smaller curvature radius among the surfaces, and being parallel to the main scanning direction.

According to the present invention based on the above-described configuration, the correction lens of the third optical system is so configured as to be rotatable about a line parallel to the main scanning direction, rotation of the correction lens enables adjustment of the amount of curving of the laser scanning line on the scanned member. Further, since the correction lens can rotate about a line passing through an intersection between the optical axis of the correction lens and the surface having a smaller curvature radius among those of the incident side surface and the outgoing side surface, the amount of movement of the scanning line in the sub-scanning direction becomes smaller even if the correction lens is rotated. In other words, according to the present invention, the amount of shifting of the scanning line in the sub-scanning direction can be suppressed to be small, and the amount of curving of the laser scanning line on the scanned member can be adjusted.

Further, in the present invention, the third optical system may include a plurality of optical devices, and the correction lens is an optical device which is arranged at a position most apart from the rotational multifaceted mirror among the optical devices.

As described above, if the correction lens is an optical device which is arranged at a position most apart from the rotational multifaceted mirror among a plurality of optical devices of the third optical system, it becomes easy to finely adjust the amount of curving of the laser scanning line on the scanned member.

Further, the correction lens may be so configured that among the incident side surface and the outgoing side, one side surface has a flat surface, and the other side surface has a cylindrical surface.

Further, the correction lens may be so configured that both the incident side surface and the outgoing side have cylindrical surfaces having curvatures different from one another.

Further, the correction lens is so configured that among the incident side surface and the outgoing side surface, one side surface has a concave surface, and the other side surface has a cylindrical surface.

Alternatively, the correction lens may be so configured that the incident side surface and the outgoing side surface have concave surfaces having curvatures different from one another.

Further, the correction lens may be so configured that the incident side surface has a flat surface and the outgoing side surface has a concave surface.

Further, the correction lens may be so configured that the incident side surface has a concave surface and the outgoing side surface has a flat surface.

Further, the correction lens is so configured that the incident side surface has a convex surface, and the outgoing side surface has a concave surface.

This application is based on Japanese Patent Application Serial No. 2007-017678 filed in Japan Patent Office on Jan. 29, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A light scanning device for scanning a scanned member by deflecting on a rotational multifaceted mirror a laser light irradiated from a scanning light source, the light scanning device comprising:
    a first optical system for forming the laser light irradiated from the light source into a parallel light flux;
    a second optical system for collecting the laser light formed into the parallel light flux toward a sub-scanning direction perpendicular to a main scanning direction, which is a direction to perform the scanning to form an image linearly on the rotational multifaceted mirror; and
    a third optical system having a function to render a scanning speed of the laser light deflected by the rotational multifaceted mirror on the scanned member to be a constant speed and form a spot-like image of the laser light deflected by the rotational multifaceted mirror on said scanned member, wherein
    the third optical system includes a correction lens whose incident side surface and outgoing side surface in a cross section in the sub-scanning direction perpendicular to the main scanning direction have respective curvature radii different from one another, and the correction lens is so configured as to be rotatable about a line passing through an intersection between an optical axis of the correction lens and a surface having a smaller curvature radius among the surfaces, and being parallel to the main scanning direction.

2. The light scanning device according to claim 1, wherein the third optical system includes a plurality of optical devices, and the correction lens is an optical device which is arranged at a position most apart from the rotational multifaceted mirror among the optical devices.

3. The light scanning device according to claim 1, wherein the correction lens is so configured that among the incident side surface and the outgoing side, one side surface has a flat surface, and the other side surface has a cylindrical surface.

4. The light scanning device according to claim 2, wherein the correction lens is so configured that among the incident side surface and the outgoing side, one side surface has a flat surface, and the other side surface has a cylindrical surface.

5. The light scanning device according to claim 1, wherein the correction lens is so configured that both the incident side surface and the outgoing side have cylindrical surfaces having curvatures different from one another.

6. The light scanning device according to claim 5, wherein a curvature radius of the incident side surface is so set as to be smaller than that of the outgoing side surface, and the correction lens is so configured as to be rotatable about a line passing through an intersection between the optical axis and the incident side surface of the correction lens and being parallel to the main scanning direction.

7. The light scanning device according to claim 1, wherein the correction lens is so configured that among the incident side surface and the outgoing side surface, one side surface has a concave surface, and the other side surface has a cylindrical surface.

8. The light scanning device according to claim 7, wherein a curvature radius of the outgoing side surface is so set as to be smaller than that of the incident side surface, and the correction lens is so configured as to be rotatable about a line passing through an intersection between the optical axis and the outgoing side surface of the correction lens and being parallel to the main scanning direction.

9. The light scanning device according to claim 1, wherein the correction lens is so configured that the incident side surface and the outgoing side surface have concave surfaces having curvatures different from one another.

10. The light scanning device according to claim 9, wherein a curvature radius of the outgoing side surface is so set as to be smaller than that of the incident side surface, and the correction lens is so configured as to be rotatable about a line passing through an intersection between the optical axis and the outgoing side surface of the correction lens and being parallel to the main scanning direction.

11. The light scanning device according to claim 1, wherein the correction lens is so configured that the incident side surface has a flat surface and the outgoing side surface has a concave surface.

12. The light scanning device according to claim 11, wherein the correction lens is so configured as to be rotatable about a line passing through an intersection between the optical axis and the outgoing side surface of the correction lens and being parallel to the main scanning direction.

13. The light scanning device according to claim 1, wherein the correction lens is so configured that the incident side surface has a concave surface and the outgoing side surface has a flat surface.

14. The light scanning device according to claim 13, wherein the correction lens is so configured as to be rotatable about a line passing through an intersection between the optical axis and the incident surface of the correction lens and being parallel to the main scanning direction.

15. The light scanning device according to claim 1, wherein the correction lens is so configured that the incident side surface has a convex surface, and the outgoing side surface has a concave surface.

16. The light scanning device according to claim 15, wherein the correction lens is so configured as to be rotatable about a line passing through an intersection between the optical axis and the outgoing surface of the correction lens and being parallel to the main scanning direction.

* * * * *